United States Patent [19]
Anderson et al.

[11] 3,755,312
[45] Aug. 28, 1973

[54] 6-SUBSTITUTED-1,2,4-PYRIMIDO[4,5-E]THIADIAZINE-1,1-DIOXIDES

[75] Inventors: Paul L. Anderson, Dover; Robert E. Manning, Mountain Lakes, both of N.J.

[73] Assignee: Sandoz-Wander, Inc., Hanover, N.J.

[22] Filed: Dec. 6, 1971

[21] Appl. No.: 205,349

Related U.S. Application Data

[63] Continuation-in-part of Ser. No. 193,555, Oct. 28, 1971, abandoned, which is a continuation-in-part of Ser. No. 108,221, Jan. 20, 1971, abandoned.

[52] U.S. Cl............ 260/243 R, 424/246, 260/256.5
[51] Int. Cl............................................. C07d 99/10

[58] Field of Search ................................ 260/243 R

[56] References Cited
UNITED STATES PATENTS
3,103,511   9/1963   Berstein et al...................... 260/243

Primary Examiner—John M. Ford
Attorney—Gerald D. Sharkin, Robert S. Honor et al.

[57] ABSTRACT

Substituted 8-amino 1,2,4-pyrimido[4,5-e]-thiadiazines-1,1-dioxides, e.g., 8-amino-3-ethyl-6-methylthio-1,2,4-pyrimido[4,5-e]thiadiazine-1,1-dioxide, are prepared from substituted 4,6-diamino-5-pyrimidine-sulfonamides and are useful as anti-hypertensives.

12 Claims, No Drawings

6-SUBSTITUTED-1,2,4-PYRIMIDO[4,5-E]THIADIAZINE-1,1-DIOXIDES

This application is a continuation-in-part of U.S. Pat. application Ser. No. 193,555, filed Oct. 28, 1971, now abandoned, which in turn is a continuation-in- part of U.S. Pat. application, Ser. No. 108,221, filed Jan. 20, 1971, now abandoned.

This invention relates to 1,2,4-pyrimido[4,5-e]thiadiazine-1,1- dioxide derivatives. More particularly, it relates to 8-amino-3,6-disubstituted- 1,2,4-pyrimido[4,5-e] thiadiazine-1,1-dioxides, methods for their preparation and their use as hypotensive/antihypertensive agents.

The compounds of this invention have the following structural formula:

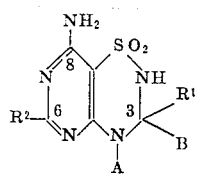

(I)

where
R$^1$ represents hydrogen or lower alkyl, i.e., alkyl having one to four carbon atoms, e.g., methyl, ethyl, isopropyl and the like, phenyl, cycloalkyl having three to six carbon atoms;

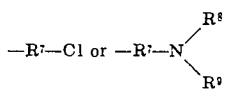

where
R$^7$ is lower alkyl as defined above and
R$^8$ and R$^9$ each independently represent hydrogen or lower alkyl as defined above and;
R$^2$ represents hydrogen, R$^3$S—, R$^3$SO$_2$—or

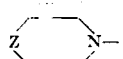

where
R$^3$ represents lower alkyl as defined above; and
R$^4$ and R$^5$ each independently represent hydrogen, alkyl having one to eight carbon atoms, alkenyl having three to five carbon atoms, e.g., allyl, methallyl and the like, phenyl or
R$^4$ and R$^5$ together with N represent where
Z represents —O— or N—H; and
A and B each represent hydrogen or A and B together represent a carbon to nitrogen bond,
provided that when R$^2$ is R$^3$S— and A and B together represent a carbon to nitrogen double bond, R$^1$ is other than hydrogen or methyl; and that when R$^2$ is R$^3$S— and A and B are both hydrogen or when R$^2$ is hydrogen and A and B together represent a carbon to nitrogen double bond, R$^1$ is other than hydrogen;
and pharmaceutically acceptable acid addition or alkali metla salts thereof.

Compounds of formula (I) in which A and B represent hydrogen and R$^2$ is other than R$^3$SO$_2$ may be prepared according to the following flow diagram:

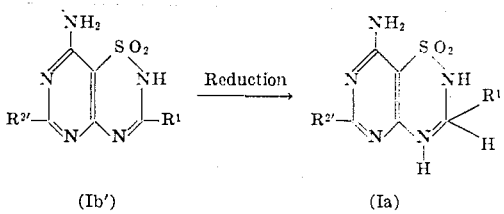

(Ib')　　　　(Ia)

where
R$^1$ represents hydrogen, lower alkyl as defined above, phenyl, cycloalkyl having three to six carbon atoms

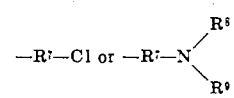

R$^{2'}$ represents hydrogen, R$^3$S—
or

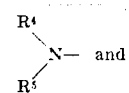

R$^3$, R$^4$, R$^5$, R$^7$, R$^8$ and R$^9$ are as defined above provided R$^1$ is other than hydrogen, when R$^{2'}$ is R$^3$S- where R$^3$ is as defined above.

The compounds of formula (Ib') are reduced to the corresponding compounds of formula (Ia) with a metallic hydride reducing agent in a suitable inert solvent. The metallic hydride reducing agents which can be used include sodium borohydride, butyl aluminum hydride, tertiary butyl aluminum hydride and the like, preferably sodium borohydride. Although the reaction temperature is not critical, the reduction is conveniently carried out at temperatures between about 50° to 150°C., preferably between 80°C. and the reflux temperature of the system. Suitable inert solvents are preferably metallic hydride solublizing solvents such as water, lower alkanols, such as methanol or ethanol, or mixtures of water and lower alcohols, although the particular solvent used is not critical. For optimum results, the reaction should be run for about 2 to 50 hours depending upon the steric hindrance of the $R^1$ group. The resulting product (Ia) is recovered by conventional techniques, e.g., filtration.

Compounds of formula (I) in which A and B represent a carbon to nitrogen bond and $R^1$ is other than

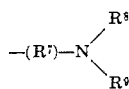

are prepared according to the following process:

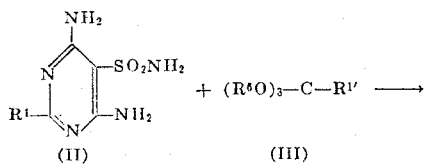

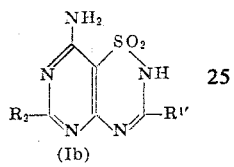

where
$R^6$ is straight chain lower alkyl having one to three carbon atoms;
$R^{1'}$ represents hydrogen, lower alkyl as defined above, phenyl, cycloalkyl having three to six carbon atoms or $-R^7-$ and
$R^2$ and $R^7$ are as defined above,
provided $R^{1'}$ is other than hydrogen or methyl when $R^2$ is $R^3S-$ where $R^3$ is as defined above.

The compounds of formula (Ib) are prepared by treating a compound of formula (II) with a trialkyl orthoalkanoate of formula (III). Although a solvent is not necessary, the reaction can be carried out using the lower alkanols indicated above or ethers, such as tetrahydrofuran, diethyl ether and the like, as solvents or preferably an excess of the compound of formula (III). The temperature at which the reaction is run is not critical, but it is preferred that the process be carried out at temperatures between about 30° to 150°C., preferably at the reflux temperature of the system. The time of the reaction is not critical, although for optimum results, it is preferred that it be run for one hour or more. The final product (Ib) is recovered by conventional techniques, e.g. filtration and recrystallization.

The compounds of formula (Ib) in which $R^2$ is $R^3SO_2-$ can and the compound of Ia in which $R^2$ is $R^3SO_2-$ are prepared according to the following process:

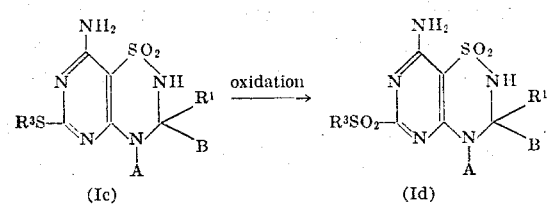

where $R^1$, $R^3$, A and B are as defined above.

The compounds of formula (Id) are prepared by treating a compound of formula (Ic) with an oxidizing agent in an organic acid solvent. The particular oxidizing agent used is not critical but chlorine or the peroxides, especially hydrogen peroxide are preferred. The organic acid solvent in which the reaction is carried out can be an organic acid such as acetic acid or propionic acid and the like, or mixtures of organic acid and water and/or organic acid anhydrides. The composition of the solvent is not critical. The temperature at which the reaction is run also is not critical, but it is preferred that the process be carried out at temperatures between about 50° to 100°C., preferably between 60° and 90°C. The time of the reaction is not critical, although for optimum results, it is preferred that it be run for one hour or more. The final product (Id) is recovered by conventional techniques, e.g., filtration and recrystallization.

The compounds of formula (I) in which $R^2$ is

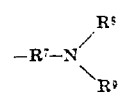

can also be prepared according to the following process:

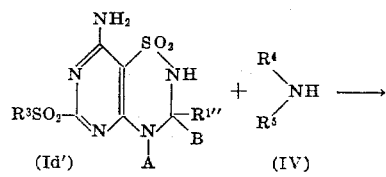

where
$R^{1''}$ represents hydrogen, lower alkyl as defined above, phenyl, cycloalkyl having three to six carbon atoms or $$-R^7-N\begin{matrix}R^8\\R^9\end{matrix}$$

and
A, B, $R^3$, $R^4$, $R^5$, $R^7$, $R^8$ and $R^9$ are as defined above.

The compounds of formula (Ie) are prepared by treating a compound of formula (Id') with an amine of formula (IV). Although a solvent is not necessary, the reaction can be carried out using the lower alkanols or the ethers indicated above as solvents or an excess of the compound of formula (IV) when it is a liquid. The preferred solvents are the lower alcohols. The temperature at which the reaction is run is not critical but it is preferred that the process be carried out at temperatures between about 20° to 100°C., preferably between 20° to 30° C. The time of the reaction is not critical. The final product (Ie) is recovered by conventional techniques, e.g., filtration and recrystallization.

Certain of the compounds of formula (I) may be prepared by the following reaction scheme:

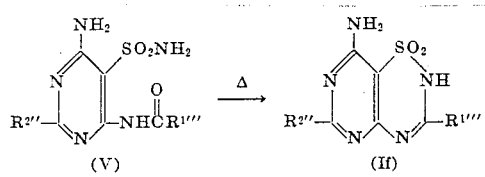

where
R¹'''' represents hydrogen, lower alkyl as defined above, cycloalkyl having three to six carbon atoms or —R⁷—Cl and
R²''' is hydrogen, R³S—, R³SO₂ or

where
R³, R⁴ and R⁵ and the proviso are as defined above and with the further proviso that at least one of R⁴ or R⁵ is other than hydrogen.

The compound of formula (If) are prepared by cyclizing a compound of formula (V) by heating. The cyclizing may be carried out by heating the compound of formula (V) to its melting point or by heating it when R² is other than R³SO₂—, in the presence of a strong base in water. The strong base can be ammonium hydroxide, sodium hydroxide or potassium hydroxide. The reaction with the base is generally carried out at between 75° to 110°C for about 1 to 24 hours, although the particular temperature and time are not critical. The product is recovered by conventional techniques, e.g., concentration and filtration.

The compounds of formula V are prepared in accordance with the following reaction scheme:

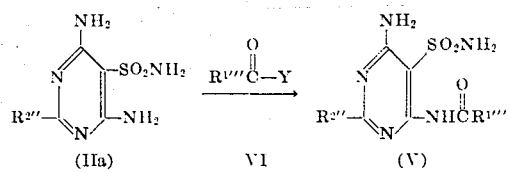

where
Y is hydroxy or halo having an atomic weight of about 35 to 80 and;
R²'' and R¹'''' are as defined previously The compounds of formula (V) are prepared by acylating a compound of formula (IIa) with a compound of formula VI in an inert solvent. The acylation can be carried out using the acid chloride or acid bromide form of compound (VI) or by using the acid form of compound VI in conjunction with oxalyl chloride or bromide. The inert solvent is preferably aromatic hydrocarbon, ethers such as tetrahydrofuran, or excess compound (VI), when liquid. Although the temperature is not critical, the reaction is normally carried out at a temperature of 20° to 50°C; preferably 20° to 30°C. The time is not critical, but the reaction should be run for about 1 to 6 days for optimum results. The product is recovered by conventional techniques, e.g., evaporation and recrystallization.

The compounds of formula (I) in which R² and A and B are hydrogen may also be prepared by the following procedure:

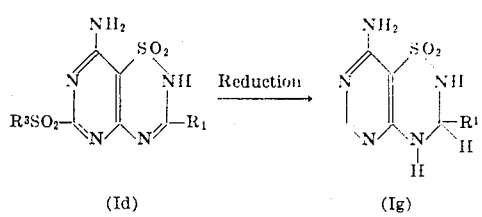

where
R¹ and R³ are as defined previously.

The compounds of formula (Ig) are prepared by reducing the compounds of formula (Id) in a protolytic solvent with a metallic hydride reducing agent. The preferred solvent is water, but lower alcohols such as methanol or ethanol or mixtures of water and lower alcohols may also be used. The metallic hydride reducing agents which can be used include those set out above for the preparation of compound (Ia) from compound (Ib'), especially sodium borohydride. The temperature at which the reaction is carried out is not critical, but the reaction is generally run at between about 20°C to 50°C preferably 20° to 30°C. Although the time is not critical, it is preferred that the reaction be run for at least 1 hour. The product is recovered by conventional techniques, e.g., filtration.

The compounds of formula (I) in which R¹ is

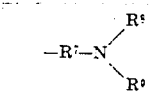

are prepared in accordance with the following reaction scheme:

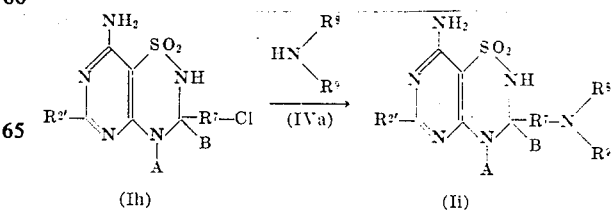

where
- $R^7$ is lower alkyl as defined above and,
- $R^8$ and $R^9$ each independently represents hydrogen or lower alkyl and
- $R^{2'}$, A, and B are as defined above The compounds of formula (Ii) are prepared by treating the compounds of formula (Ih) with a compound of formula (IVa). Although a solvent is not required, it is preferred that the reaction be run in lower alcohol such as methanol or ethanol or in excess compound (IVa). The temperature at which the reaction is carried out is not critical, but the reaction is generally run at between about 0°C to 100°C preferably 40° to 50°C. Although the time is not critical it is preferred that the reaction be run for 1 to 5 hours. The product is recovered by conventional techniques e.g. evaporation.

The compounds of formula (II) in which

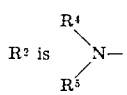

are prepared in accordance with the following reaction scheme:

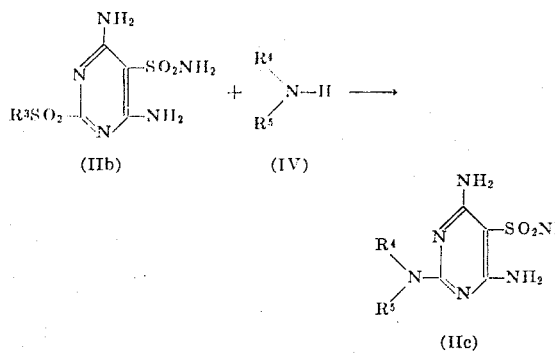

where $R^3$, $R^4$ and $R^5$ are as defined above.

The compounds of formula (IIc) are prepared by treating a 4,6-diamino-2-alkylsulfonyl-5-pyrimidinesulfonamide of formula (IIb) with an amine of formula (IV). Although it is not necessary that the reaction be carried out in a solvent, it is preferred that an inert hydroxylic solvent such as water or lower alkanol or, where feasible, an excess of amine (IV) be used. The temperature at which the reaction is run is not critical although it is preferred that temperatures between room temperature and the reflux temperature of the reaction medium be used. The product is recovered by conventional means, e.g., evaporation.

The compounds of formula (II) in which $R^2$ is hydrogen can be prepared from the compound of formula (IIb) using the same procedure respectively as used to produce the compounds of formula (Ig).

The compounds of formula (Ib) and (Ib') in which $R^1$ is hydrogen or methyl when $R^{2'}$ is $R^3S-$ where $R^3$ is as previously defined, are known and can be prepared by the procedure for preparing compounds (Ib). Likewise, the compounds of formula (Ic) in which $R^1$ is hydrogen or methyl when A and B represent a carbon to nitrogen double bond or in which $R^1$ is hydrogen when A and B both represent hydrogen are known and can be prepared by the procedures for preparing compounds (Ib) and (Ia) respectively.

The compounds of formula (II) in which $R^2$ is $R^3SO_2-$ (compound IIb) or $R^3S-$ and the compounds of formula (III) and many of the compounds of formula (IV), (IVa) and (VI) are known and can be prepared by methods disclosed in the literature. The compounds of formula (IV), (IVa) and (VI) not specifically disclosed in the literature can be prepared by analogous methods from known starting materials.

The compounds of formula (I) are useful because they possess pharmacological activity in animals. In particular, the compounds are useful as hypotensive/anti-hypertensive agents, as indicated by their activity in renal hypertensive rats given 100 mg/kg of active compound using the techniques of A. Grollman (Proc. Soc. Expt. Biol. and Med. 57 : 102, 1944) and indirectly measuring the blood pressure from the caudal artery in the tail using a pneumatic pulse transducer.

When so utilized, the compounds may be combined with one or more pharmaceutically acceptable carrier or adjuvants. They may be administered orally or parenterally and, depending upon the compound employed and the mode of administration, the exact dosage utilized may vary.

Furthermore, the compounds of formula (I) may be similarly administered in the form of their non-toxic pharmaceutically acceptable acid addition or alkali metal salts. Such salts possess the same order of activity as the free base, are readily prepared by reacting the base with an appropriate acid or with an alkali metal alcoholate and accordingly, are included within the scope of the invention. Representative of the acid addition salts are the mineral acid salts, such as the hydrochloride, hydrobromide, sulfate, phosphate and the like and the organic acid salts, such as the succinate, benzoate, acetate, p-toluenesulfonate, benzenesulfonate, and the like. Representative of the alkali metal salts are the lithium, sodium and potassium salts.

In general, satisfactory results are obtained when these compounds are administered as a hypotensive/anti-hypertensive agent at a daily dosage of about 1.0 milligrams to about 200 milligrams per kilogram of animal body weight p.o. This daily dosage is preferably administered 2 to 4 times a day, or in sustained release form. For most large mammals, such as primates, the total daily dosage is from about 75 milligrams to about 1,000 milligrams. Dosage forms suitable for internal use comprise from about 18.5 milligrams to about 500 milligrams of the active compound in intimate admixture with a solid or liquid pharmaceutically acceptable carrier or diluent.

A representative formulation suitable for oral administration is a tablet or capsule prepared by standard encapsulating techniques which contain the ingredients indicated below and are useful in treating hypertension at a dose of one tablet or capsule 2 to 4 times a day.

| Ingredient | Weight (mg) tablet | capsule |
|---|---|---|
| 8-amino-3-ethyl-6-methylthio 1,2,4-pyrimidino[4,5-e]thiadiazine-1,1-dioxide | 50 | 50 |
| tragacanth | 10 | - |
| lactose | 197.5 | 250 |
| corn starch | 25 | |
| talcum | 15 | |

| | Percent by Weight | |
|---|---|---|
| | syrup | elixir |
| 8-amino-3-ethyl-6-methylthio-1,2,4-pyrimidino [4,5-e] thiadiazine-1,1-dioxide (sodium salt) | .5-3.5 | .5-3.5 |
| Buffering System | quantity sufficient to adjust pH | |
| Sodium Benzoate | .1-.5 | .1-.5 |
| Flavoring Agent | .01-.2 | .01-.2 |
| Water | 20-40 | 5-20 |
| Simple syrups U.S.P. | 30-70 | 0 |
| Sorbitol solution (70%) | 10-30 | 20-60 |
| Certified Dye | .5-2 | .5-2 |
| Alcohol | 0 | 2.5-20 |
| Methyl Paraben | 0 | .05-.1 |
| Propyl Paraben | 0 | .05-.1 |
| Sodium Saccharin | 0 | .01-.08 |
| Alcohol | 0 | 2.5-20 |
| Methyl Paraben | 0 | .05-.1 |
| Propyl Paraben | 0 | .05-.1 |
| Sodium Saccharin | 0 | .01-.08 | magnesium stearate 2.5
Total 300 mg. 300 mg.

The following formulations for syrups or elixirs useful in the treatment of hypertension containing an effective amount of active compound may be formulated using conventional methods.

EXAMPLE 1

8-amino-3-ethyl-6-methylthio-1,2,4-pyrimido[4,5-e]thiadiazine-1,1-dioxide

To 60.0 g of 4,6-diamino-2-methylthio-5-pyrimidinesulfonamide is added 900 ml of triethylorthopropionate and the mixture is refluxed for 2 hours in an oil bath at 120°–130°. Upon cooling, the 8-amino-3-ethyl-6-methylthio-1,2,4pyrimido[4,5-e]thiadiazine-1,1-dioxide precipitates and is filtered and recrystallized from methanol, mp 275°–283°.

When the above procedure is carried out using an equivalent amount of
1. 4,6-diamino-2-methylsulfonyl-5-pyrimidinesulfonamide;
2. 4,6-diamino-2-octylamino-5-pyrimidinesulfonamide;
3. 4,6-diamino-2-ethylthio-5-pyrimidinesulfonamide or
4. 4,6-diamino-5-pyrimidinesulfonamide in place of the 4,6-diamino-2-methylthio-5-pyrimidinesulfonamide there is obtained
1. 8-amino-3-ethyl-6-methylsulfonyl-1,2,4-pyrimido[4,5-e]thiadiazine-1,1-dioxide (m.p. 270°–272°C);
2. 8-amino-3-ethyl-6-octylamino-1,2,4-pyrimido[4,5-e]thiadiazine-1,1-dioxide;
3. 8-amino-3-ethyl-6-ethylthio-1,2,4-pyrimido[4,5-e]thiadiazine-1,1-dioxide or
4. 8-amino-3-ethyl-1,2,4-pyrimido[4,5-e]thiadiazine-1,1-dioxide (m.P. 330°–332°C)respectively.

The above products are suspended in methanol and treated with sodium methoxide to give the following sodium salts:
1. sodium-8-amino-3-ethyl-6-methylthio-1,2,4-pyrimido[4,5-e]thiadiazine-1,1-dioxide (m.p. 317°–319°C).
2. sodium-8-amino-3-ethyl-6-methylsulfonyl-1,2,4-pyrimido[4,5-e]thiadiazine-1,1-dioxide.
3. sodium-8-amino-3-ethyl-6-octylamino-1,2,4-pyrimido[4,5-e]thiadiazine-1,1-dioxide (m.p. 190°–200°C; monohydrate);
4. sodium-8-amino-3-ethyl-6-ethylthio-1,2,4-pyrimido[4,5-e]thiadiazine-1,1-dioxide (m.p. 299°–302°C) or
5. sodium-8-amino-3-ethyl-1,2,4-pyrimido[4,5-e]thiadiazine-1,1-dioxide.

When 8-amino-3ethyl-6-methylthio-1,2,4-pyrimido[4,5-e]thiadiazine-1,1-dioxide is suspended in methanol and hydrogen chloride gas is bubbled through the mixture for one-half hours, there is obtained the hydrochloride salt of 8-amino-3-ethyl-6-methylthio-1,2,4-pyrimido[4,5-e]thiadiazine-1,1-dioxide (m.p. 278°–280°C).

EXAMPLE 2

When the process of example 1 is carried out using 60.0 gm of 4,6-diamino-2-methylthio-5-pyrimidinesulfonamide and in place of the 900 ml of triethylorthopropionate an equivalent amount of
1. triethylorthopentanoate
2. triethylorthochloroacetate
3. triethylorthobenzoate
4. triethylorthoisobutyrate
5. triethylorthobutyrate
6. triethylorthocyclopentanecarboxylate or
7. triethylorthocyclopropanecarboxylate there is obtained
1. 8-amino-3-butyl-6-methylthio-1,2,4-pyrimido[4,5-e]thiadiazine-1,1-dioxide (m.p. of sodium salt 298°–302°C; monohydrate);
2. 8-amino-3-chloromethyl-6-methylthio-1,2,4-pyrimido[4,5-e]thiadiazine-1,1 -dioxide (m.p. of sodium salt 305°–310°C; hemihydrate).
3. 8-amino-3-phenyl-6-methylthio-1,2,4-pyrimido[4,5-e]thiadiazine-1,1-dioxide (m.p. 273°–278°C);
4. 8-amino-3-isopropyl-6-methylthio-1,2,4-pyrimido[4,5-e]thiadiazine-1,1 dioxide (m.p. of sodium salt 215°–225°C);
5. 8-amino-3-propyl-6-methylthio-1,2,4-pyrimido[4,5-e]thiadiazine-1,1-dioxide (m.p. of sodium salt 336°–337°C; hemihydrate);
6. 8-amino-3-cyclopentyl-6-methylthio-1,2,4-pyrimido[4,5-e]thiadiazine-1,1-dioxide (m.p. 245°–247°) or
7. 8-amino-3-cyclopropyl-6-methylthio-1,2,4-pyrimido[4,5-e]thiadiazine-1,1-dioxide (m.p. 245°–250°C; m.p. of sodium salt 190°–200°C) respectively.

EXAMPLE 3

4,6-diamino-2-morpholino-5pyrimidinesulfonamide

To 3.6 g of 4,6-diamino-2-methylsulfonyl-5-pyrimidinesulfonamide suspended in 100 ml of water is added 4.1 g of morpholine. The mixture is stirred for 1 hour at reflux temperature, and thereafter stirred for an additional 17 hours at room temperature. The solution is then filtered and dried to yield the product, 4,6-diamino-2-morpholino-5-pyrimidinesulfonamide; mp 233° C. (decomposition).

Following the above procedure but using piperazine in place of the morpholine used therein, there is obtained 4,6-diamino-2-piperazino-5-pyrimidinesulfonamide.

When an equivalent amount of 4,6-diamino-2-morpholino-5-pyrimidine sulfonamide or 4,6-diamino-2-piperazino-5-pyrimidinesulfonamide is used in place of the 4,6-diamino-2-methylthio-5- pyrimidenesulfonamide in the process of Example 1, there is obtained 8-amino-3-ethyl-6-morpholino-1,2,4-pyrimido [4,5-e]thiadiazine-1,1-dioxide (m.p. of sodium salt 297°–299 C) or 8-amino-3-ethyl-6-piperazino-1,2,4-pyrimido [4,5-e]thiadiazine-1,1-dioxide, respectively.

When the process of example 1 is carried out using equivalent amounts of 4,6-diamino-2-mopholino-5-pyrimidinesulfonamide and triethyl-orthoformate in place of the 4,6-diamino-2-methylthio-5-pyrimidinesulfonamide and triethylorthopropionate used, there is obtained 8-amino-6-morpholino-1,2,4-pyrimido [4,5-e] thiadiazine-1,1-dioxide (m.p. 287° to 290°C).

EXAMPLE 4

4,6-diamino-2-methylamino-5-pyrimidinesulfonamide

Into 12.0 g of 4,6-diamino-2-methylsulfonyl-5-pyrimidinesulfonamide suspended in 1900 ml of methanol is bubbled gaseous methylamine for 2 hours. The mixture is stirred at room temperature for an additional 15 hours and then evaporated to dryness. The crude product is triturated in 35 ml of methanol, after which it is filtered and dried. Recrystallization from methanol yields the product, 4,6-diamino-2-methylamio-5-pyrimidinesulfonamide, mp 199° – 201°.

When diallylamine or aniline is used in place of methylamine in the process of this example, there is obtained 4,6-diamino-2-diallylamino-5-pyrimidinesulfonamide or 4,6-diamino-2-anilino-5-pyrimidinesulfonamide, respectively.

Following the procedure of Example 1 but using an equivalent amount of 4,6-diamino-2-methylamino-5-pyrimidinesulfonamide; 4,6-diamino-2-diallylamino-5-pyrimidinesulfonamide; or 4,6-diamino-2-anilino-5-pyrimidine-sulfonamide in place of the 4,6-diamino-2-methylthio-5-pyrimidenesulfonamide used therein, there is obtained 8-amino-3-ethyl-6-methylamino-1,2,4-pyrimido [4,5-e] thiadiazine-1,1-dioxide (m.p. of HCl salt 235° to 248°C); 8-amino-3-ethyl-6-diallylamino-1,2,4-pyrimido [4,5-e]thiadiazine-1,1-dioxide (m.p. 161°–162°C) or 8-amino-3-ethyl-6-anilino-1,2,4-pyrimido[4,5-e] thiadiazine-1,1-dioxide, respectively.

EXAMPLE 5

8-amino-3-ethyl-6-methylsulfonyl-1,2,4-pyrimido[4,5-e]thiadiazine-1,1-dioxide

To a well stirred suspension of 32.0g of 8-amino-3-ethyl-6-methylthio-1,2,4-pyrimido[4,5-e]thiadiazine-1,1-dioxide prepared as in Example 1 in 320 ml of acetic acid and 320 ml of acetic anhydride is added dropwise 32 ml of 30 percent hydrogen peroxide. The temperature is maintained below 90° C. by cooling in an ice bath. After about 1 ½ hours, the product is precipitated by cooling and separated by filtration. The product, 8-amino-3-ethyl-6-methylsulfonyl-1,2,4-pyrimido[4,5-e]-thiadiazine-1,1-dioxide (mp 270°–272°C., decomposition) is recovered by recrystallization from methanol.

EXAMPLE 6

8-amino-3-methyl-6-methylsulfonyl-1,2,4-pyrimido[4,5-e]thiadiazine-1,1-dioxide

To 5.0 g of 8-amino-3-methyl-6-methylthio-1,2,4-pyrimido[4,5-e] thiadiazine-1,1-dioxide suspended in 150 ml of glacial acetic acid and 150 ml of acetic anhydride is added dropwise 5 ml of 30 percent hydrogen peroxide. The reaction mixture is stirred overnight at room temperature and the precipitated 8-amino-3-methyl-6-methylsulfonyl-1,2,4-pyrimido[4,5-e] thiadiazine-1,1-dioxide is recovered by filtration, mp 285° – 287°.

When an equivalent amount of 8-amino-6-methylthio-1,2,4-pyrimido[4,5-e]thiadiazine-1,1-dioxide is used in place of the 8-amino-3-methyl-6-methylthio-1,2,4-pyrimido[4,5-e]thiadiazine-1,1-dioxide in the above process, there is obtained 8-amino-6-methylsulfonyl-1,2,4-pyrimido[4,5-e]thiadiazine-1,1-dioxide.

EXAMPLE 7

8-amino-3methyl-6-methylamino-1,2,4-pyrimido[4,5-e]thiadiazine-1,1-dioxide hydrochloride Three grams of 8-amino-3-methyl-6-methylsulfonyl-1,2,4-pyrimido [4,5-e]thiadiazine-1,1-dioxide is suspended in 200 ml of methanol and methylamine gas is bubbled through the suspension for 15 minutes. Most of the solvent is then removed, and the precipitate 8-amino-3-methyl-6-methylamino-1,2,4-pyrimido[4,5-e]thiadiazine-1,1-dioxide (mp 338°–339° d.) is filtered off and recrystallized from methanol.

Into a suspension of 1.2 g of this material in 35 ml of methanol is bubbled hydrogen chloride gas for 10 minutes. The precipitate which forms on cooling is filtered off to yield 8-amino-3-methyl-6-methylamino-1,2,4-pyrimido[4,5-e]thiadiazine-1,1-dioxide hydrochloride; (mp 332° – 334° C. d.).

When an equivalent amount of 8-amino-6-methylsulfonyl-1,2,4-pyrimido[4,5-e]thiadiazine-1,1-dioxide is used in place of the 8-amino-3 methyl-6-methylsulfonyl-1,2,4-pyrimido[4,5-e]thiadiazine-1,1-dioxide in the above process there is obtained 8-amino-6-methylamino-1,2,4-pyrimido [4,5-e]thiadiazine-1,1-dioxide.

EXAMPLE 8

8-amino-3-ethyl-6-methylamino-1,2,4-pyrimido[4,5-e]thiadiazine-1,1-dioxide hydrochloride Ten grams of 8-amino-3-ethyl-6-methylsulfonyl-1,2,4-pyrimido[4,5-e] thiadiazine-1,1-dioxide is suspended in 600 ml of methanol and methylamine gas is bubbled through the suspension for 30 minutes. Cooling and filtration yields 8-amino-3-ethyl-6-methylamino-1,2,4-pyrimido[4,5-e]thiadiazine-1,1-dioxide.

Into a suspension of 5.8 g of this material in 200 ml of methanol is bubbled hydrogen chloride gas for 15 minutes, until a clear solution forms. The majority of the solvent is then removed by evaporation and ether is added to precipitate 8-amino-3-ethyl-6-methylamino-1,2,4-pyrimido [4,5-e]thiadiazine-1,1-dioxide hydrochloride (mp 235° – 248° C. d.).

When the above procedure is carried out and equivalent amounts of diallylamine, aniline, morpholine or piperazine are used in place of the methylamine used therein, there is obtained the hydrochloride salt of 8-amino-3-ethyl-6-diallylamino-1,2,4-pyrimido[4,5-e]thiadiazine-1,1-dioxide; 8-amino-3-ethyl-6-anilino-1,2,4-pyrimido[4,5-e]thiadiazine-1,1-dioxide; 8-amino-3-ethyl-6-morpholino-1,2,4-pyrimido[4,5-e]thiadiazine-1,1-dioxide or 8-amino-3-ethyl-6-piperazine-1,2,4-pyrimido[4,5-e]thiadiazine-1,1-dioxide, respectively.

EXAMPLE 9

8-amino-3,4-dihydro-3-methyl-6-methylthio-1,2,4-pyrimido[4,5-e]thiadiazine-1,1-dioxide.

To 7.3 g of sodium borohydride dissolved in 200 ml of water is slowly added 20.0 g of 8-amino-3-methyl-6-methylthio-1,2,4-pyrimido[4,5-e]thiadiazine-1,1-dioxide. After the addition is complete, the reaction mixture is heated at 90° for 48 hours. On cooling, the product, 8-amino-3,4-dihydro-3-methyl-6-methylthio-1,2,4-pyrimido[4,5-e]thiadiazine-1,1-dioxide precipitates and is recovered by filtration (mp 228°–229°C, m.p. of HCl salt 213°–215°C).

When an equivalent amount of 8-amino-3-ethyl-1,2,4-pyrimido [4,5-e]thiadiazine-1,1-dioxide; 8-amino-3-ethyl-6-methylthio-1,2,4-pyrimido[4,5-e]thiadiazine-1,1-dioxide; 8-amino-6-methylamino-1,2,4-pyrimido [4,5-e]thiadiazine-1,1-dioxide; 8-amino-3-methyl-6-methylamino-1,2,4,-pyrimido[4,5-e]thiadiazine-1,1-dioxide; 8-amino-3-ethyl-6-methylamino-1,2,4-pyrimido[4,5-e]thiadiazine-1,1-dioxide; 8-amino-3-ethyl-6-diallylamino-1,2,4-pyrimido[4,5-e]thiadiazine-1,1-dioxide; 8-amino-3-ethyl-6-anilino-1,2,4-pyrimido[4,5-e]thiadiazine-1,1-dioxide; 8-amino-3-ethyl-6-morpholino-1,2,4-pyrimido[4,5-e]thiadiazine-1,1-dioxide or 8-amino-3-ethyl-6-piperazino-1,2,4-pyrimido[4,5-e] thiadiazine-1,1-dioxide is used in place of 8-amino-3-ethyl-6-methylthio-1,2,4-pyrimido[4,5-e]thiadiazine-1,1-dioxide in the above process there is obtained 8-amino-3,4-dihydro-3-ethyl-1,2,4-pyrimido [4,5-e]thiadiazine-1,1-dioxide; (m.p. of sodium salt 220°–225°C; dihydrate); 8-amino-3,4-dihydro-3-ethyl-6-methylthio-1,2,4-pyrimido[4,5-e]thiadiazine-1,1-dioxide; (m.p. of sodium salt 194° to 196°C; monohydrate); 8-amino-3,4-dihydro-6-methylamino-1,2,4-pyrimido[4,5-e]thiadiazine-1,1-dioxide; 8-amino-3,4-dihydro-3-methyl-6-methylamino-1,2,4-pyrimido[4,5-e]thiadiazine-1,1-dioxide; 8-amino-3,4-dihydro-3-ethyl-6-methylamino-1,2,4-pyrimido[4,5-e]thiadiazine-1,1-dioxide; 8-amino-3,4-dihydro-3-ethyl-6-diallylamino-1,2,4-pyrimido[4,5-e] thiadiazine-1,1-dioxide; 8amino-3,4-dihydro-3-ethyl-6-anilino-1,2,4-pyrimido[4,5-e]thiadiazine-1,1-dioxide; 8-amino-3,4-dihydro-3-ethyl-6morpholino-1,2,4-pyrimido[4,5-e]thiadiazine-1,1-dioxide (m.p. of sodium salt 232°–242°C, monohydrate) or 8-amino-3,4-dihydro-3-ethyl-6-piperizino-1,2,4-pyrimido[4,5-e]thiadiazine-1,1-dioxide, respectively.

EXAMPLE 10

8-Amino-3,4-dihydro-3-methyl-6-methylsulfonyl-1,2,4-pyrimido[4,5-e]thiadiazine-1,1-dioxide Following the procedure of Example 5 but using an equivalent amount of 8-amino-3,4-dihydro-3-methyl-6-methylthio-1,2,4-pyrimido[4,5-e]thiadiazine-1,1-dixoide or 8-amino-3,4-dihydro-6-methylthio-1,2,4-pyrimido [4,5-e]thiadiazine-1,1-dioxide in place of the 8-amino-3-ethyl-6-methylthio-1,2,4-pyrimido[4,5-e]thiadiazine-1,1-dioxide used therein, there is obtained 8-amino-3,4-dihydro-3-methyl-6-methylsulfonyl-1,2,4-pyrimido[4,5-e]thiadiazine-1,1-dioxide or 8-amino-3,4-dihydro-6-methylsulfonyl-1,2,4-pyrimido[4,5-e]thiadiazine-1,1-dioxide respectively. When 8-amino-3,4-dihydro-3-methyl-6-methylsulfonyl-1,2,4-pyrimido[4,5-e]thiadiazine-1,1-dioxide is treated with methylamine in accordance with the process of Example 6, there is obtained 8-amino-3,4-dihydro-3-methyl-6-methylamino-1,2,4-pyrimido[4,5-e]thiadiazine-1,1-dioxide.

EXAMPLE 11

8-amino-3-cyclopropyl-6-methylthio-1,2,4-pyrimido [4,5-e]thiadiazine-1,1-dioxide Step A: 6-amino-cyclopropanecarbonylamido-2-methylthio-5-pyrimidinesulfonamide To 11.76 of 4,6-diamino-2-methylthio-5-pyrimidinesulfonamide dissolved in 300 ml. of tetrahydrofuran is added dropwise 5.6 g. of cyclopropane carbonyl chloride. The mixture is stirred while refluxing for 4 days following which the crystals are filtered and the tetrahydrofuran solution evaporated to dryness. The residue is washed with 20 ml of ether, 30 ml. of tetrahydrofuran, 50 ml of water and 100 ml of methanol and then dried to obtain 1.2 g of the product; m.p. 211°–214°C.

Step B: 8-amino-3-cyclopropyl-6-methylthio-1,2,4-pyrimido-[4,5-e]thiadiazine-1,1-dioxide In a round bottom flask is placed 0.979 g. of 6-amino-4-cyclopropanecarbonylamido-2-methylthio-5-pyrimidinesulfonamide which is then heated to 240° in an oil bath. A quantitative yield of the product is obtained, m.p. 245°–250°C.

The sodium salt was prepared by suspension in methanol and addition of sodium methoxide. Recrystallization from ethanol gave sodium 8-amino-3-cyclopropyl-6-methylthio-1,2,4-pyrimido-[4,5-e]thiadiazine 1,1-dioxide hemihydrate, m.p. 190°–200°.

Following the above procedure but using an equivalent amount of propionyl chloride or butyryl chloride in place of the cyclopropane carbonyl chloride, there is obtained 6-amino-4-propionylamido-2-methylthio-5-pyrimidinesulfonamide or 6-amino-4-butyrylamido-2-methylthio-5-pyrimidinesulfonamide respectively before heating and 8-amino-3-ethyl-6-methylthio-1,2,4-pyrimido-[4,5-e]thiadiazine-1,1-dioxide or 8-amino-3-propyl-6-methylthio-1,2,4-pyrimido [4,5-e] thiadiazine-1,1-dioxide respectively after heating.

EXAMPLE 12

Sodium-8-amino-3-cyclopentyl-6-methylthio-1,2,4-pyrimido-[4,5-e]thiadiazine-1,1-dioxide Step A: 6-amino-4-cyclopentanecarbonylamido-2-methylthio-5-pyrimidinesulfonamide To 19.5 g. of oxalyl chloride is added slowly at room temperature 17.4 g. of cyclopentane carboxylic acid. The solution is stirred at room temperature for 15 minutes and then at 100°for 30 minutes. To this mixture is added 5.0 g. of finely powdered 4,6-diamino-2-methylthio-5-pyrimidinesulfonamide. The reactants are heated at 100° for 1.5 hours, at 120° for 3 hours and at 130° for 9 hours. The mixture is then cooled to room temperature and the crystals filtered and washed with ether. Recrystallization from methanol-ether yields the title product (m.p. 219°–221°C).

Step B: Sodium-8-amino-3-cyclopentyl-6-methylthio-1,2,4-pyrimido-[4,5-e]thiadiazine-1,1-dioxide To 3.8 g. of 6-amino-4-cyclopentanecarbonylamido-2-methylthio-5-pyrimidine-sulfonamide is added 700 ml. of 28 percent ammonium hydroxide solution. The mixture is heated at 105° for 9 hours following which it is concentrated under vacuum. The title product is obtained by filtration (m.p. 245°–247°).

On treatment of 2.0 g. of this 8-amino-3-cyclopentyl-6-methylthio-1,2,4-pyrimido[4,5-e]thiadiazine 1,1-dioxide with sodium methoxide in methanol, the hemihydrate of the sodium salt is obtained, (m.p. 325°).

When the above process is carried out and an equivalent amount of propionic acid, isobutyric acid or cyclopropyl carboxylic acid is used in place of the cyclopentane carboxylic acid, there is obtained before heating in base 6-amino-4-propionylamido-2-methylthio-5-pyrimidinesulfonamide; 6-amino-4-isobutyrylamido-2-methylthio-5-pyrimidinesulfonamide or 6-amino-4-cyclopropylcarbonylamido-2-methylthio-5-pyrimidinesulfonamide respectively and after heating in a strong base there is obtained 8-amino-3-ethyl-6-methylthio-1,2,4-pyrimido [4,5-e]thiadiazine-1,1-dioxide; 8-amino-3-isopropyl-6methylthio-1,2,4pyrimido [4,5-e]thiadiazine-1,1-dioxide or 8-amino-3-cyclopropyl-6-methylthio-1,2,4-pyrimido [4,-5-e]thiadiazine-1,1-dioxide respectively.

EXAMPLE 13

8-amino-3-ethyl-3,4-dihydro-1,2,4-pyrimido[4,5-e]thiadiazine-1,1-dioxide

To a suspension of 15.0 gms of 8-amino-3-ethyl-6-methysulfonyl -1,2,4-pyrimido [4,5-e] thiadiazine -1,1-dioxide is added slowly 8.0 g of sodium borohydride. The reaction mixture is stirred for 1 hour at room temperature after which the title product is isolated by filtration and dried (m.p. of the sodium salt dihydrate 220°–225°C)

EXAMPLE 14

8-amino-3-methylaminomethyl-6-methylthio-1,2,4-pyrimido[4,5-e]thiadiazine-1,1-dioxide In 500 ml of methanol, 10 gms of 8-amino-3-chloromethyl-6-methylthio-1,2,4-pyrimido [4,5-e] thiadiazine-1,1-dioxide is suspended and methylamine gas is added for 30 minutes. The reaction mixture is then heated at 40°–50°C for 1½ to 2 hours after which it it cooled and filtered. The filtrate is evaporated down to 100 ml and filtered. The residue is washed with cold methanol and dried to yield the title product (m.p. 254° to 257°C).

What is claimed is

1. A compound of the formula

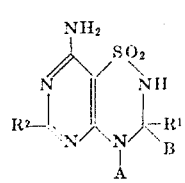

where
R¹ represents hydrogen, lower alkyl, phenyl, cycloalkyl having three to six carbon atoms,

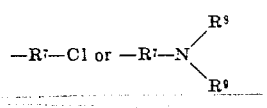

where
R⁷ represents lower alkyl and
R⁸ and R⁹ each independently represent hydrogen or lower alkyl and
R² represents hydrogen, R³S—,R³SO₂ or

where
R³ represents lower alkyl; and
R⁴ and R⁵ each independently represent hydrogen, alkyl having one to eight carbon atoms, alkenyl having three to five carbon atoms, phenyl or
R⁴ and R⁵ together with N represents

where
Z is —O— or

and
A and B each represent hydrogen or A and B together represent a carbon to nitrogen bond, provided that when R² is R³S— and A and B together represent a carbon to nitrogen double bond, R¹ is other than hydrogen or methyl; and that when R² is R³S— and A and B are both hydrogen or when R² is hydrogen and A and B together represent a carbon to nitrogen double bond, R¹ is other than hydrogen; or a pharmaceutically acceptable acid addition or alkali metal salt thereof.

2. A compound, according to claim 1 in which R¹ is lower alkyl having 2 to 4 carbon atoms, phenyl, cycloalkyl having three to six carbon atoms, —R⁷—Cl or

R² is R³—S—and A and B together represents a carbon to nitrogen bond
where
R³, R⁷, R⁸ and R⁹ are as defined in claim 1 or a pharmaceutically acceptable acid addition or alkali metal salt thereof.

3. The compound of claim 1 which is 8-amino-3-ethyl-6-methyl-sulfonyl-1,2,4-pyrimido[4,5-e]thiadiazine-1,1-dioxide.

4. The compound of claim 1 which is 8-amino-3-methyl-6-methyl-sulfonyl-1,2,4-pyrimido[4,5-e]thiadiazine-1,1-dioxide.

5. The compound of claim 1 which is 8-amino-3-methyl-6-methylamino-1,2,4-pyrimido[4,5-e]thiadiazine-1,1-dioxide.

6. The compound of claim 1 which is 8-amino-3-ethyl-6-methylamino-1,2,4-pyrimido-[4,5-e]thiadiazine-1,1dioxide.

7. The compound of claim 1 which is 8-amino-3,4-dihydro-3-ethyl -6-methylthio-1,2,4-pyrimido[4,5-e]thiadiazine-1,1-dioxide.

8. The compound of claim 2 which is 8-amino-3-ethyl-6-methylthio-1,2,4-pyrimido[4,5-e]thiadiazine-1,1-dioxide.

9. The compound of claim 2 which is 8-amino-3-isopropyl-6-methylthio-1,2,4-pyrimido[4,5-e]thiadiazine-1,1-dioxide.

10. The compound of claim 2 which is 8-amino-3-butyl-6-methylthio-1,2,4-pyrimido[4,5-e]thiadiazine-1,1-dioxide.

11. A process for producing a compound of the formula

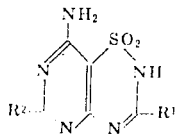

which comprises treating a compound of the formula

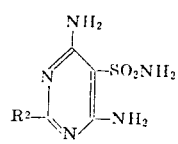

with a compound of the formula

where
R¹′ represents hydrogen, lower alkyl, phenyl, cycloalkyl having three to six carbon atoms or —R⁷—Cl,
R⁶ is straight chain lower alkyl having one to three carbon atoms; and
R² and R⁷ are as defined in claim 1, provided R¹′ is other than hydrogen or methyl when R² is R³S— as defined in claim 1.

12. A process for producing a compound of the formula

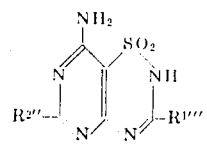

which comprises treating in a polar solvent a compound of the formula

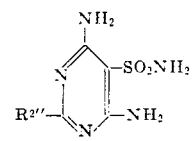

with a compound of the formula

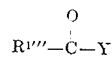

where
Y is hydroxy or halo having an atomic weight of about 35 to 80;
provided that when Y is hydroxy, the process is carried out in the presence of oxalyl chloride or oxalyl bromide to form an intermediate of the formula

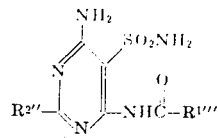

and thereafter cyclizing said intermediate by heating where
R¹′′′ is hydrogen, lower alkyl, cycloalkyl having three to six carbon atoms or —R⁶—Cl;
R²′′ is hydrogen, R³S, R³SO₂ or

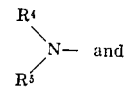

R³, R⁴, R⁵, R⁶ and the proviso are as set out in claim 1 with the added proviso that at least one of R⁴ or R⁵ is other than hydrogen.

* * * * *